Sept. 23, 1941.  C. D. PETERSON ET AL  2,257,071
POPPETLESS SYNCHRONIZING CLUTCH
Filed June 6, 1940
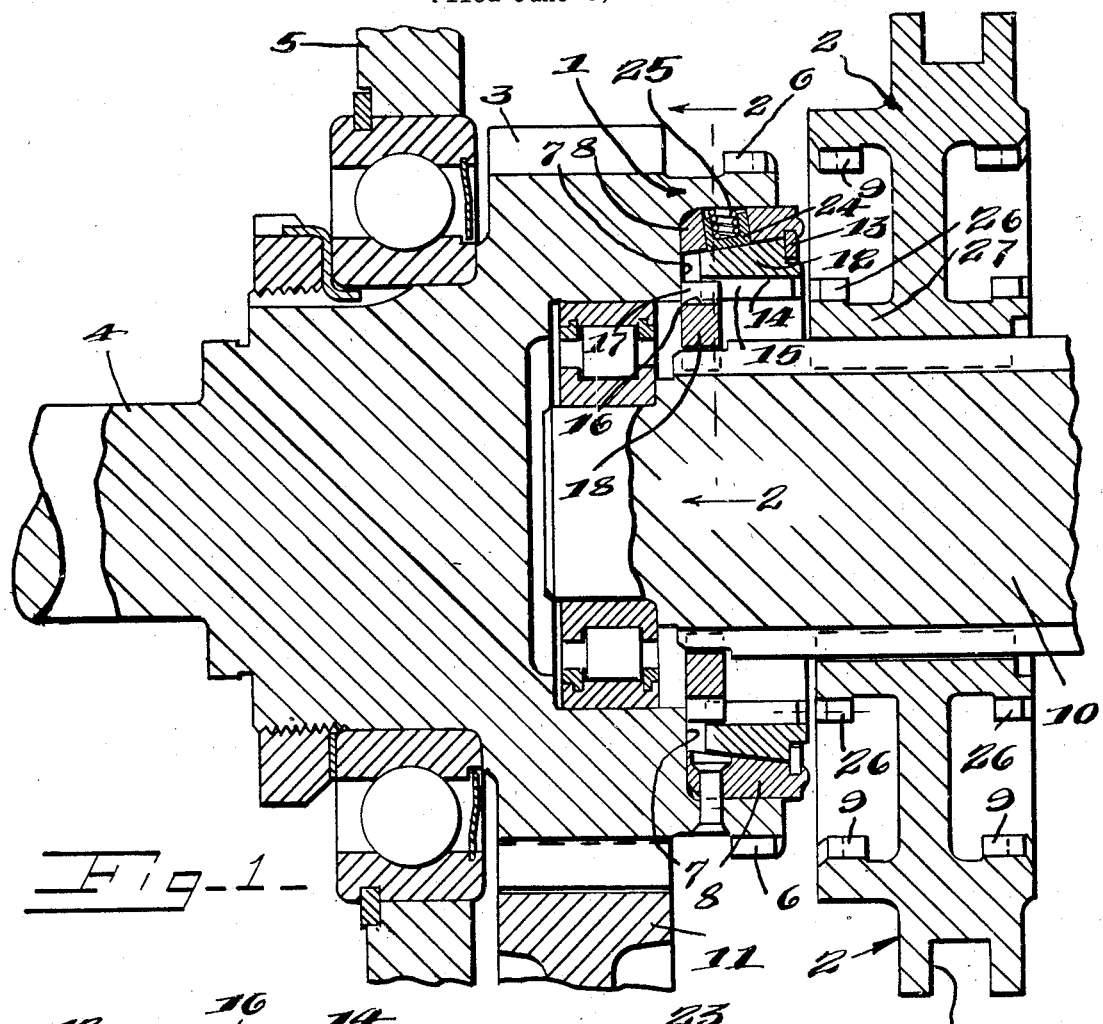
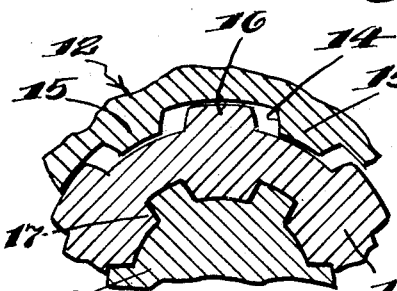
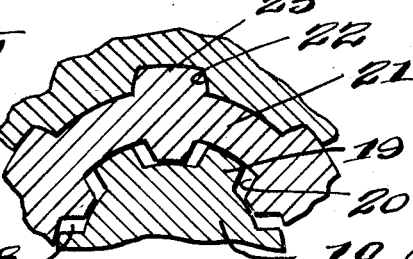
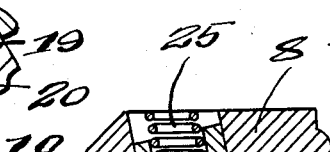
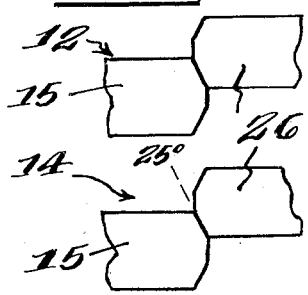
INVENTORS
Carl D. Peterson & Albert W. Deimel
BY Bordell & Thompson
ATTORNEYS Patented Sept. 23, 1941

2,257,071

UNITED STATES PATENT OFFICE 2,257,071

POPPETLESS SYNCHRONIZING CLUTCH

Carl D. Peterson and Albert H. Deimel, Toledo, Ohio

Application June 6, 1940, Serial No. 339,143

6 Claims. (Cl. 192—53)

This invention relates to synchronizing clutches, such as are used in the transmission gears of motor vehicles, and has for its object friction synchronizing clutch sections capable of transmitting torque to effect synchronizing and operable in connection with toothed or jaw clutch sections, one of which is shiftable into and out of engagement with the other, which friction clutch sections embody means for causing them to normally engage with sufficient initial frictional drag, to cause one of the friction sections, which is a blocking or locking ring, to be shifted circumferentially or rocked into locking position, before the jaw clutch sections are engaged, and to rock into unlocking position, as the speeds of the two parts to be clutched together synchronize, to permit the shiftable jaw section to be shifted into engagement with the other jaw section.

It further has for its object a clutch in which the locking friction section or ring is not initially shifted axially as a unit into engaged position by the shifting of the shiftable jaw section, but is subject to some axial pressure when the locking friction section or ring is in locking position and shifting pressure being applied to the shiftable jaw section, and therefore has for its object what might be called the poppetless synchronizing clutch, that is, a clutch in which there are no poppets or yielding or retractile members normally coupling the shiftable section and one of the friction sections together, so that they initially shift axially as a unit, and then upon synchronization, the jaw section shifts relatively to the friction section, due to the yielding out of normal position of the poppets.

It further has for its object a synchronizing clutch which consists of a minimum number of compactly arranged parts.

The invention consists in the novel features and in the combinations and constructions hereinafter set forth and claimed.

In describing this invention, reference is had to the accompanying drawing in which like characters designate corresponding parts in all the views.

Figure 1 is a longitudinal sectional view through a clutch embodying this invention, the contiguous portions of the elements of a transmission gearing to be coupled together being also shown.

Figure 2 is a sectional view on line 2—2, Figure 1.

Figure 3 is a slightly modified form of the construction shown in Figure 2.

Figure 4 is a detail diagrammatic view illustrating the normal separation of the coacting friction rings rotatable respectively with the driving and driven jaw clutch elements.

Figure 5 is an enlarged diagrammatic view illustrating the co-operation of the rocking locking ring and the projections or teeth coacting therewith on the shiftable jaw section.

The synchronizing clutch includes generally, driving and driven jaw clutch elements, one of which is shiftable axially into and out of engagement with the other, and synchronizing means including coacting friction rings rotatable respectively with said elements and one of the rings being capable of a circumferential rocking movement relatively to the element with which it rotates and having transverse passages therethrough for coacting with projections or teeth on the jaw clutch element with which it rotates, with the projections of such width as to slidably fit the passages, when alined therewith, but to lap the ring on one side or the other of said passages, when the ring is rocked circumferentially out of a central or alined position by the differential speeds of the two elements to be clutched together, but to be brought into alinement as the speeds synchronize, the blocking ring being capable of a slight axial shifting movement and being normally out of frictional engagement with the coacting friction ring, with one of the rings having means, as a yielding spring-pressed shoe or shoes coacting with the other with sufficient pressure to create a slight frictional drag sufficient to drag the blocking ring or rock it circumferentially or cause it to be rotated in locking or unlocking position.

In the illustrated embodiment of the invention, the driven clutch element is shiftable axially and the friction synchronizing ring, which has a rocking movement, is rotatable with the axially shiftable element and also relative thereto within limits.

1 designates the driving clutch element, and 2 the driven clutch element, the driving clutch element being here shown as formed integral with a gear 3 on the input shaft 4 of the transmission gearing, the shaft 4 and the gear 3 being in the usual form of a stem gear journalled in a wall 5 of the gear box. The driving element 1 is here shown as formed with external clutch teeth or jaws 6 and also with an axial recess 7 in which is located a friction clutch section or ring 8 rotatable with the element 1. For convenience in manufacturing, the ring 8 is a separate part from the element 1. The driven element 2 is provided with internal clutch teeth or jaws 9 complemental to the clutch teeth or jaws 6 and is splined to and shiftable axially on a driven or output shaft 10 of the gearing, which is mounted in axial alinement with the input shaft 4. The clutch element 2 is here shown as double and shiftable axially in one direction from neutral to connect the input shaft 4 and output shaft 10 in direct drive relation and in the opposite direction to connect the shafts 4, 10 in indirect drive relation through a counter shaft, and gears thereon, one of which gears 11 meshes with the stem gear 3.

The clutch section with which the jaw section 2 co-operates, when shifted to the right from neutral, is the same general construction as the clutch element 1 and associated parts and embodies the same type of locking or blocking ring, to be presently described.

12 designates a friction section or ring rotatable with the toothed shiftable section 2 and also having a circumferential movement, within limits, or a rocking movement relatively to the jaw section 2. The friction sections or rings 8 and 12 are here shown as provided with complemental conical friction faces. These two rings are held in assembled relation in the recess 7 of the element 1 by a lock ring 13. The friction faces of the rings 8 and 12 are normally slightly separated or out of frictional engagement, and one of the sections or rings 8, 12 is provided with means projecting beyond its conical friction face and for engaging the friction face of the other section, when the friction faces of the sections are spaced apart, as in Figure 4, said means compressing or yielding as the friction faces of the sections come into engagement. As here shown, the means comprises specifically one or more yielding or spring-pressed elements, as shoes, projecting beyond its conical friction face and pressing against the conical friction face of the other ring, in order to create a slight frictional drag between the two rings sufficient to rock the blocking ring 12 and prevent overthrow thereof upon reversal of the torque under momentum or inertia, including overthrow during synchronization. This blocking ring 12 has a slight axial movement, when pressure is applied thereto, to engage the normally separated friction faces, as will be presently described.

The friction ring 12 is provided with transverse passages 14 which provide internal splines 15 coacting with complemental external splines 16 and passages 17 formed in a collar 18 splined without lost motion or circumferential movement on the output shaft 10. The passages 14 and 17 are of greater width than the splines 16 and 15, so that the friction section or locking ring 12 has a rocking movement relatively to the output shaft 10, and hence relatively to the jaw clutch section 2.

In Figure 3, the lost motion for permitting the locking movement is shown as provided by forming the passages 20 in the collar 21, corresponding to the collar 18 (Figure 2) are of slightly greater width than the splines 19 on the output shaft (Figure 2) and the passages 22 corresponding to the passages 14 (Figure 2) fit the splines 23 corresponding to the splines 16 (Figure 2). The splines 23 fit the internal splines of the gear 2 without looseness but the passages 20 of the ring 21 are wider than the splines 19 on the shaft 10.

24 designates the spring-pressed shoes, or one of the same, this being shown as carried by the friction section 8 rotatable with the driving clutch element 1 and being in the form of a cup guided in a radially extending passage in the ring 8 with the head of the cup pressing beyond the conical friction face by a spring 25. The spring seats at one end in the cup and thrusts at its outer end against the annular wall of the recess 7.

26 designates projections or teeth here shown as on the hub 27 of the shiftable element 2, these being of substantially the width of transverse passages 14 (Figures 1 and 2) to slidably fit the same, and hence to lap on one side or the other of said passages, as seen in Figure 5, when the passages are out of alinement with the projections or teeth 26. The ends of the projections or teeth 26 are preferably beveled at such an abrupt angle as to block axial shifting until the speeds synchronize. The beveled ends coact with complemental beveled faces on the locking friction ring 12 on opposite sides of the passages 14. The beveling angle is, in the clutch here illustrated, about 25°. This bevel is in contradistinction to flat faces usually employed in so-called balking ring clutches, in order to make the operation of balking ring type of clutch in accordance with synchronizing clutches.

In a balking ring clutch, the end faces of the teeth or projections corresponding to the teeth or projections 26 and the faces on the splines corresponding to the splines 15 on the friction ring 12 are flat, and hence, regardless of what the actual pressure used to shift is, no camming action results, and there is no tendency to unlock or rotate the balking ring when the speeds of the two units are the same. Unlocking only takes place when the speeds are crossed.

On the other hand, in this synchronizing clutch embodying a balking ring, due to the small friction cone angles used on the friction rings, the friction rings actually become momentarily powerful friction clutches, and cause the speeds of the two parts to be clutched together to equalize the speeds, and the speeds of the two parts to be clutched together can not be made to cross because the driven member of the friction clutch ordinarily can not be made to run faster than the driving member. Therefore, in order to unlock this balking ring clutch with a synchronizing action, the faces of the projections or teeth 26 and 15 are formed at an angle, making them cams, so that after synchronization, the pressure on these cams produces a torque which causes the two clutch members to rotate relatively to each other, causing the balking ring to unlock to permit engagement of the toothed faces of the clutch members.

In operation, when a shift is to be made to the left in Figure 1, the shifting of force is applied by the operator through a gear shifting lever, or its equivalent, to a fork working in a groove 28 of the shiftable clutch element 2. Assuming that at the time the shift is made, the driving element 1 is rotating the faster and clockwise, when looking to the right, the blocking ring 12 will have been carried into the position shown in Figure 5, whereby the passages 14 are out of alinement with the projections 26, thus blocking shifting of the toothed clutch element 2 to the left, and the engagement of the teeth or jaws 9 with the teeth or jaws 6. While there is slipping between the conical faces of the rings 8 and 12 and axial shifting pressure applied to the shiftable clutch section 2, there will be torque tending to rotate the balking ring 12 and the section 2, thereby keeping the projections or teeth 26 in locked position relatively to the splines 15, as seen in Figure 5. In other words, the axial shifting pressure passes across the cam or beveled faces on the teeth or projections 26 and the splines 15, to the ring 8 which, in this embodiment of the invention, is fixed from axial movement. Thus, the pressure axially is the same in both locations. The unlocking torque, that is, the torque required to shift the balking ring under the influence of the shifting pressure applied by the shifting fork to the clutch section 2, is determined by the bevel or steepness of the cam angles between the projections or teeth 26 and the splines 15 of the balking ring, the greater the cam angle the greater the unlocking pressure, since the teeth 26 tend to slide down the slope or bevel of the splines 15. Opposed to this unlocking torque is the torque action of the ring 8 relatively to the balking ring 12. As long as there is slippage between these two rings, torque in the locking direction is produced which depends upon the angle of the conical friction faces between these rings 8 and 12. For proper locking, this torque must be greater than the unlocking torque, due to the bevel or cam angle of the teeth or projections 26 and the splines 15 on the balking ring. During shifting-in operations, when slipping between the ring 8 and the balking ring 12 ceases, no further locking torque is exerted, and hence the shifting pressure applied to the shiftable section 2 causes the cam angles of the beveled ends of the teeth 26 to rock or rotate the balking ring 12, ring 8, gear 3 to which it is secured and any parts rotatable with the gear, until unlocking takes place, that is, until the projections or teeth 26 are alined with the spaces 14 between the splines 15 of the balking ring.

Under some circumstances, as for instance, when the vehicle is coasting, the synchronization may take place by a speeding up of the output shaft.

In the form shown in Figure 3, the projections 26 slidably fit the passages 22 but these passages are carried out of and into alinement with the projections 26, due to the relative rotary movement of the ring 21 to the output shaft 10, the relative rotary movement being permitted by the splines 19 working in the wider passages 20. The passages 14 or 22 extend the full width or the axial length of the ring 12 and the collar 18 interlocks only with the inner end portion of said passages, making the remainder of said passages available for the projections 26.

This synchronizing clutch, owing to its construction, is particularly compact as to axial length, consists of a minimum number of parts, as the complications of the conventional or standard synchronizing clutches are eliminated embodying an outer sleeve friction section formed with slots in which cam posts on an inner toothed section coact and poppets between the sleeve and inner toothed section, and also makes the connection of the shiftable section with the shifting fork extremely simple.

What we claim is:

1. A synchronizing clutch including driving and driven jaw clutch elements, one of which is shiftable axially into and out of engagement with the other, and synchronizing means including coacting friction rings rotatable respectively with said elements, one of said rings being capable of a circumferential rocking movement relatively to the element with which it rotates and having transverse passages therethrough and the element with which it rotates having projections for slidably fitting the passages and receivable in the same upon axial movement of the shiftable element, the projections being normally out of the passages in position to thrust against the rocking ring on one side or the other of said passages when the clutch elements are rotating at different speeds and the passages being movable into alinement with said projections when the speeds synchronize and the ring rocked, said rings being normally arranged out of frictional engagement, and yielding projections on one ring coacting with the other ring for creating initial frictional drag between the two rings sufficient to rock the rocking ring into locking position whenever the speeds of the two clutch elements are unequal, preliminary to clutch engagement.

2. A synchronizing clutch including driving and driven jaw clutch elements, one of which is shiftable axially into and out of engagement with the other, and synchronizing means including coacting friction rings rotatable respectively with said elements, one of said rings being capable of a circumferential rocking movement relatively to the element with which it rotates and having transverse passages therethrough, and the element with which it rotates having projections for slidably fitting the passages and receivable in the same upon axial movement of the shiftable element, the projections being normally out of the passages in position to thrust against the rocking ring on one side or the other of said passages when the clutch elements are rotating at different speeds and the passages being movable into alinement with said projections when the speeds synchronize and the ring rocked, said rings being normally arranged out of frictional engagement, and a yielding projection on one of said rings and frictionally engaging the other of said rings.

3. A synchronizing clutch including driving and driven jaw clutch elements, one of which is shiftable axially into and out of engagement with the other, and synchronizing means including coacting friction rings rotatable respectively with said elements, one of said rings being capable of a circumferential rocking movement relatively to the element with which it rotates and having transverse passages therethrough and the element with which it rotates having projections for slidably fitting the passages and receivable in the same upon axial movement of the shiftable element, the projections being normally out of the passages in position to thrust against the rocking ring on one side or the other of said passages when the clutch elements are rotating at different speeds, and the passages being movable into alinement with said projections when the speeds synchronize and the ring rocked, said rings being normally arranged out of frictional engagement, and yieldingly pressed means on one ring coacting with the other ring for creating initial frictional drag between the two rings sufficient to rock the rocking ring into locking position whenever the speeds of the two clutch members are unequal, preliminary to clutch engagement, said means being carried by one ring and normally projecting beyond the friction face thereof and coacting with the friction face of the other ring.

4. A synchronizing clutch including driving and driven jaw clutch elements, one of which is shiftable axially into and out of engagement with the other, and synchronizing means including coacting friction rings rotatable respectively with said elements, one of said rings being capable of a circumferential rocking movement relatively to the element with which it rotates and having transverse passages therethrough and the element with which it rotates having projections for slidably fitting the passages and receivable in the same upon axial movement of the shiftable element, the projections being normally out of the passages in position to thrust against the rocking ring on one side or the other of said passages when the clutch elements are rotating at different speeds and the passages being movable into alinement with said projections when the speeds synchronize and the ring rocked, said rings being normally arranged out of frictional engagement, the rings having conical friction faces normally separated and a yielding projection carried by one ring and projecting beyond the friction face thereof and engaging the friction face of the other ring.

5. A synchronizing clutch including driving and driven jaw clutch elements, one of which is shiftable axially into and out of engagement with the other, and synchronizing means including coacting friction rings rotatable respectively with said elements, one of said rings being capable of a circumferential rocking movement relatively to the element with which it rotates and having transverse passages therethrough and the element with which it rotates having projections for slidably fitting the passages and receivable in the same upon axial movement of the shiftable element, the projections being normally out of the passages in position to thrust against the rocking ring on one side or the other of said passages when the clutch elements are rotating at different speeds, and the passages being movable into alinement with said projections when the speeds synchronize and the ring rocked, the walls of the ring on opposite sides of the passages and the ends of projections coacting at such an inclined angle as to block axial shifting until the speeds synchronize, said rings being normally arranged out of frictional engagement, said rings having coacting conical friction faces which are normally out of frictional engagement, and a yielding projection carried by one ring and projecting beyond the conical face thereof and coacting with the conical face of the other ring.

6. A synchronizing clutch including driving and driven jaw clutch elements, one of which is shiftable axially into and out of engagement with the other, and synchronizing means including coacting friction rings rotatable respectively with said elements, one of said rings being capable of a circumferential rocking movement relatively to the element with which it rotates and having transverse passages therethrough and the element with which it rotates having projections for slidably fitting the passages and receivable in the same upon axial movement of the shiftable element, the projections being normally out of the passages in position to thrust against the rocking ring on one side or the other of said passages when the clutch elements are rotating at different speeds and the passages being movable into alinement with said projections when the speeds synchronize and the ring rocked, the walls on opposite sides of the passages and the ends of the projections coacting at such an inclined angle as to block axial shifting until the speeds synchronize, said rings being normally separated and means on one of the rings and frictionally engaging the other of said rings and yieldable as the rings come into frictional engagement.

CARL D. PETERSON.
ALBERT H. DEIMEL.